Sept. 9, 1958   C. A. NICHOLS ET AL   2,850,795
APPARATUS FOR SECURING LAMINATIONS TO A SHAFT
Filed March 22, 1952   6 Sheets-Sheet 2
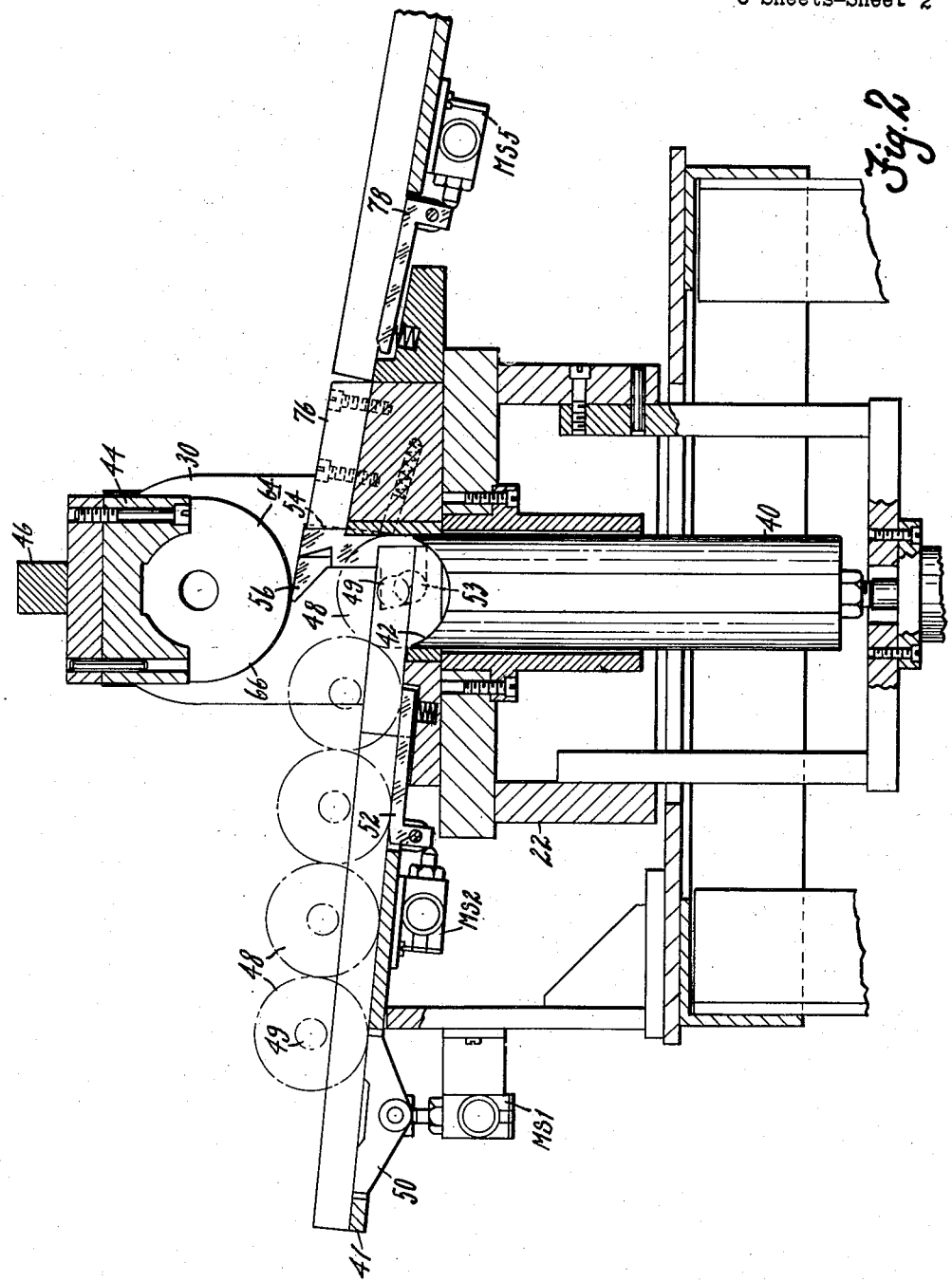
INVENTORS
CHARLES A. NICHOLS
GEORGE L. WEISER
BY
THEIR ATTORNEYS

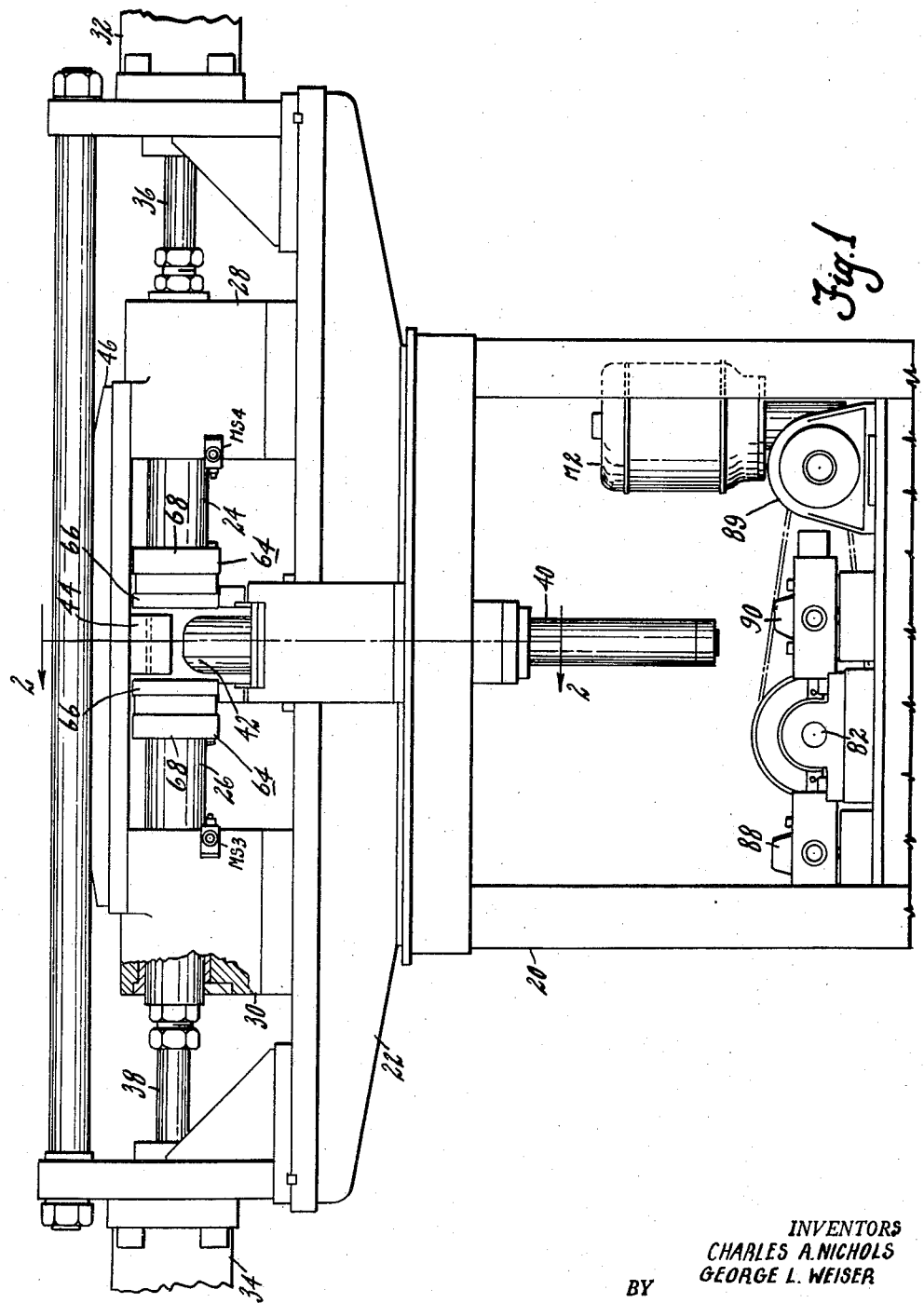

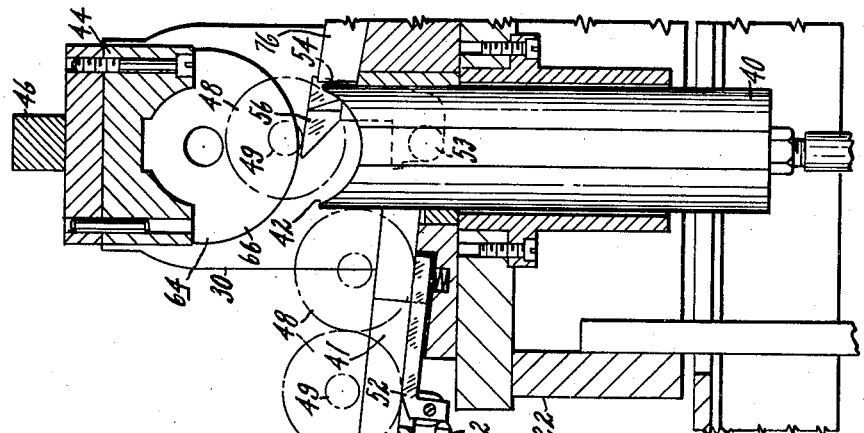
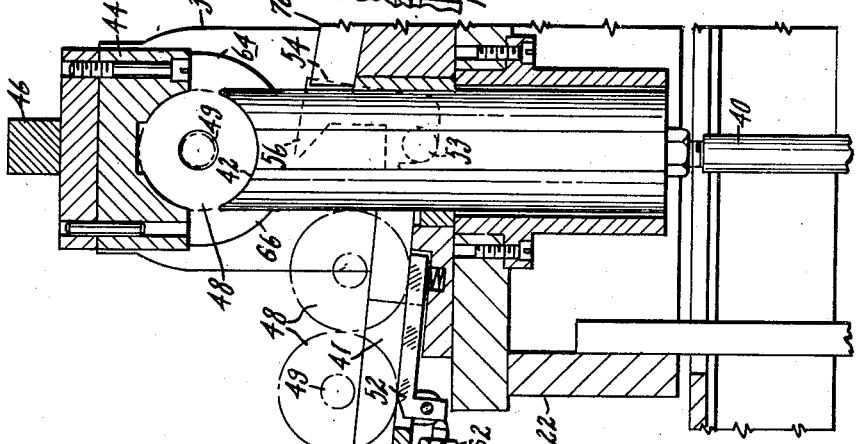
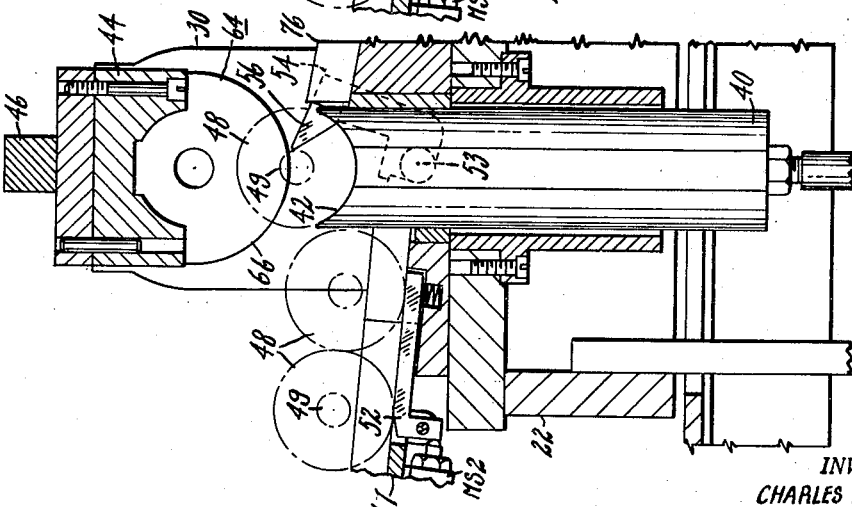
INVENTORS
CHARLES A. NICHOLS
GEORGE L. WEISER
BY
THEIR ATTORNEYS

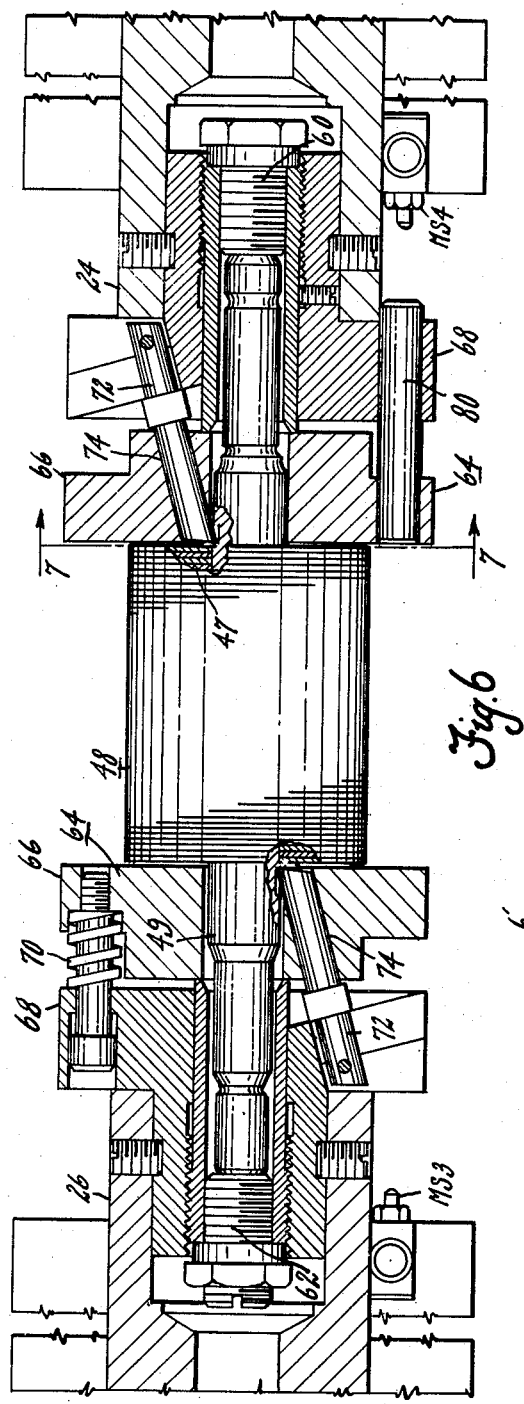

Sept. 9, 1958　　　C. A. NICHOLS ET AL　　　2,850,795
APPARATUS FOR SECURING LAMINATIONS TO A SHAFT
Filed March 22, 1952　　　　　　　　　　6 Sheets-Sheet 5

INVENTORS
CHARLES A. NICHOLS
GEORGE L. WEISER
BY
THEIR ATTORNEYS

Sept. 9, 1958  C. A. NICHOLS ET AL  2,850,795
APPARATUS FOR SECURING LAMINATIONS TO A SHAFT
Filed March 22, 1952  6 Sheets-Sheet 6

INVENTORS
CHARLES A. NICHOLS
GEORGE L. WEISER
BY
THEIR ATTORNEYS

United States Patent Office 2,850,795
Patented Sept. 9, 1958

2,850,795
APPARATUS FOR SECURING LAMINATIONS TO A SHAFT

Charles A. Nichols, Anderson, and George L. Weiser, Middletown, Ind., assignors to General Motors Corporation, Detroit, Mich., a corporation of Delaware Application March 22, 1952, Serial No. 278,091

3 Claims. (Cl. 29—203)

This invention relates to a machine for assembling a plurality of laminations upon a shaft and to a method of operating said machine.

It is, therefore, the prime object of the invention to provide a machine and method of operating same wherein a plurality of separate laminae may be placed on a shaft, the shaft with the laminae thereon positioned in a fixture which centers the shaft, compresses the laminae into tight relation with respect to one another at their interfaces and then stakes the laminae in place by gouging into the shaft in a plurality of positions to fixedly position the laminations thereon.

In carrying out the above object, it is a further object to provide a machine which is automatic in operation and which supplies unstaked assemblies to a press whereupon the machine is automatically actuated to grip the assembly, press the laminations together, perform the staking operation and then discharge the assembly from the press while receiving another assembly for operation, all of said operations being automatically controlled through an electrical circuit including safety devices operable to prevent actuation of any of the machine operations in the event that the parts to be operated on are not in proper position.

A still further object of the invention is to provide a machine for staking armature laminations onto a motor or generator shaft wherein the laminations in proper number are assembled on the shaft and the shaft with the laminae thereon is then automatically positioned in a press which compresses the laminations into juxtaposed position, one to the next, and in properly spaced relation with respect to the ends of the shaft and which finally stakes the laminations in such position.

Further objects and advantages of the present invention will be apparent from the following description, reference being had to the accompanying drawings, wherein preferred embodiments of the present invention are clearly shown.

In the drawings:

Fig. 1 is a side view of the machine with the feed chute removed.

Fig. 2 is a section taken through a portion of the machine on line 2—2 of Fig. 1, showing the feed and discharge chutes and the means used to position the assembly for the staking operation.

Figs. 3, 4, and 5 are successive views of the positioning means and taken together with Fig. 2 show the rotor in initial position, being moved upwardly, being clamped in the upper fixture and being discharged.

Fig. 6 is a sectional view taken through the clamping and staking mechanism in position indicated by section 6—6 and 6'—6' of Fig. 7, wherein section 6—6 refers to the left hand side of the Fig. 6 and section 6'—6' refers to the right hand side thereof.

Fig. 7 is a view taken on line 7—7 of Fig. 6.

Fig. 8 is a partial perspective view of one end of an assembled armature, showing the staked portions of the shaft pressing against the end laminations.

Figure 9:
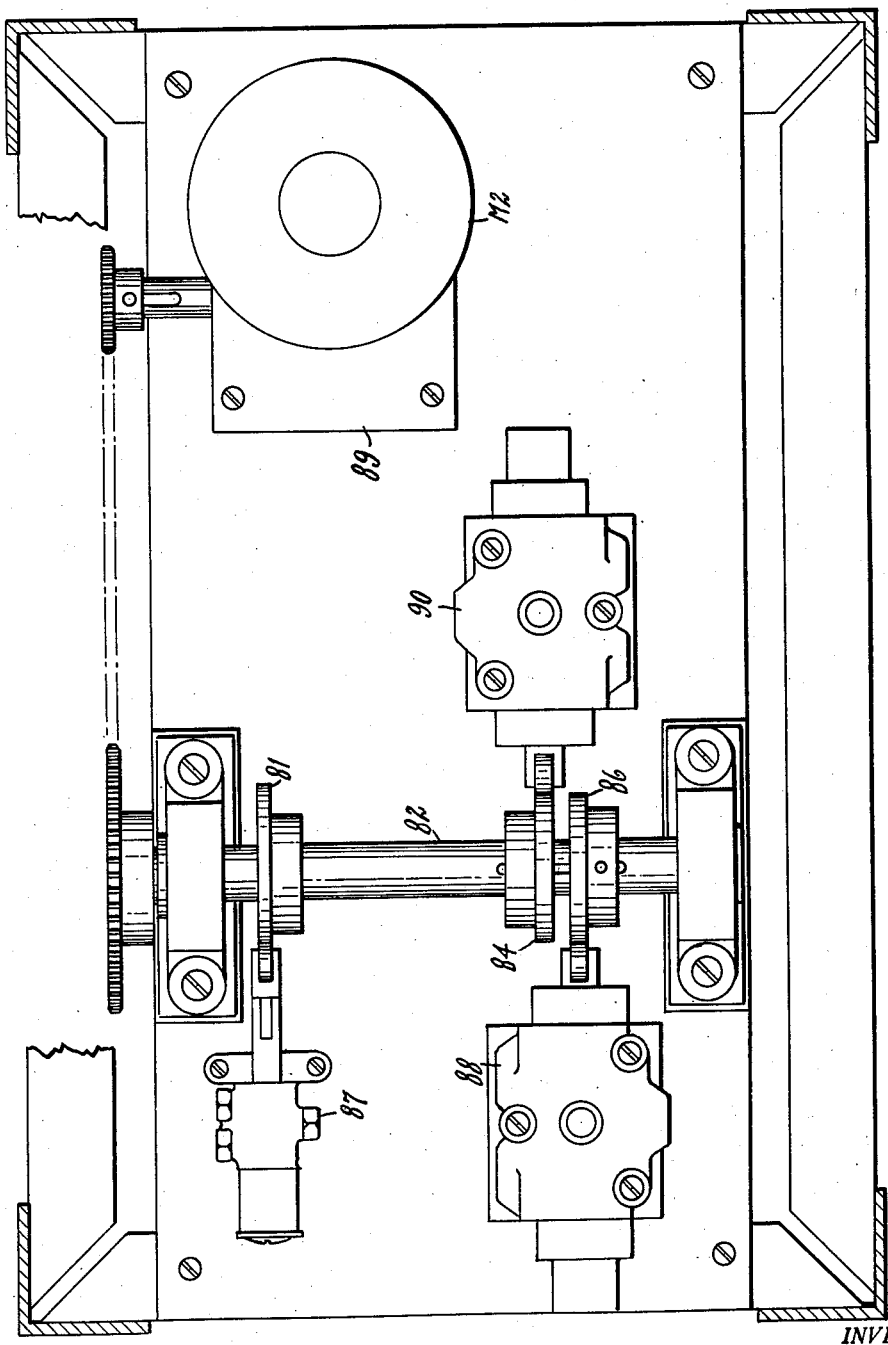

Fig. 9 is a plan view taken on line 9—9 of Fig. 1 showing diagrammatically the positioning of the hydraulic control valves and cam controls therefor together with the hydraulic pump motor and speed reducer which operates the setup.

Figure 10:
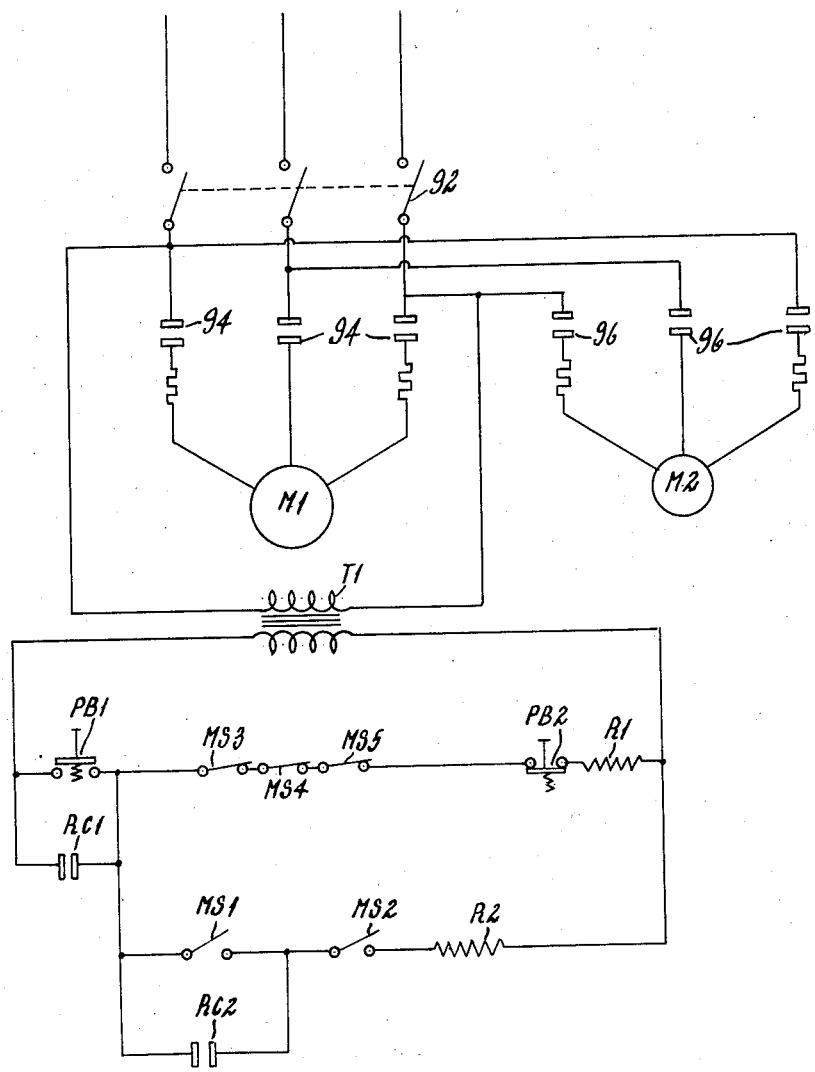

Fig. 10 is a wiring diagram of the control circuit used in connection with the machine.

The assembly of armature laminations to a shaft usually entails placing a correct number of laminations on the shaft and then fixedly positioning them to the shaft either by welding, positioning rings or other expedients. The present apparatus and process is used primarily in connection with a tubular shaft such as is disclosed in co-pending application, Serial No. 256,332, but obviously can be used in connection with a solid shaft as well. The apparatus shown in the drawings accomplishes all of the necessary functions in an automatic manner wherein a plurality of laminations are assembled to the shaft and properly oriented thereon either by splines as shown in the said aforementioned application or in any other suitable manner. This assembly is then placed on the feed apparatus of a machine wherein successive assemblies are operated upon by pressing the laminations into tight relation with one another and in proper axial location upon the shaft and then, while holding the laminations in said tight relation, providing automatically operated punches for causing the laminations to be staked into position by gouging into the shaft metal and raising tangs which holds the laminations tightly one to another in proper position on the shaft.

Referring specifically to the drawings, a side view of the apparatus is shown in Fig. 1, wherein a frame 20 supports a bed 22 which carries a pair of plungers 24 and 26 thereon journaled in bearing blocks 28 and 30, respectively. The plungers 24 and 26 are operated by hydraulic cylinders 32 and 34, shown in part through pistons 36 and 38. Intermediate the plungers is a pneumatically or hydraulically operated elevating column or press 40 which includes an upper nest 42 that cooperates with an immovable nest portion 44 carried by a bar 46 which is mounted on bearing blocks 28 and 30. The hydraulic elevator 40 and nests 42 and 44 are shown in cross section in Fig. 2, wherein a feed chute 41 is provided which is not shown in Fig. 1 for the incoming armature assemblies noted in dotted lines at 48 and each comprising laminations 47 and a shaft 49. Any number of these assemblies may be supported on the chute 41 in accordance with its length. The chute 41 includes two micro switches MS1 and MS2, the actuating portions thereof, shown at 50 and 52 respectively, forming portions of the floor of the chute. In control of the device, it is necessary for both switches MS1 and MS2 to be closed to start operation which automatically determines that at least five armatures are on the chute. The machine will operate until only one armature is present on the chute at which time both switches will be open as will be explained hereinafter. The machine will operate after initiation of operation with switch MS1 open but will cease operation when switch MS2 opens. Switch MS2 will open at any time when the two armatures are not present upon the actuating portion 52. These switches therefore automatically control operation of the machine in accordance with the supply of armatures to be operated upon.

When an armature 48 rolls into nest 42, a hydraulic cylinder causes the elevator 40 to raise nest 42 upwardly as shown in Fig. 3 with the armature 48 thereon. In this position, a bifurcated lever, pivoted at 53 and shown in dotted line at 54, having a pair of fingers 56 at either side thereof adapted to engage the ends of the shaft 49, is hinged out of the way so that the armature 48 can pass upwardly. The armature 48 is elevated by the nest 42 until it engages the upper nest 44 as shown in Fig. 4, whereupon it is held in position and the bifurcated lever 54, which is spring biased, returns to its normal upright position. In the position shown in Fig. 4, the two plungers 24 and 26 are actuated toward the laminations 47 whereupon, due to the nests 42 and 44, the ends of the shaft 49 which carry laminations therebetween of the armature 48, pass into cylindrical nests formed in each of the plungers 24 and 26. The depth of these nests may be adjusted through screws 60 and 62 so that when the two plungers 24 and 26 are in desired relation to one another, the screws 60 and 62 are pressing the shaft 49 therebetween. At the end of the plungers 24 and 26 are identical mechanisms, namely, a spring pressed pressure head 64 which includes a spring pressed plate 66 and an immovable plate 68, one of which is carried by each plunger. Between the two plates are a plurality of springs 70 which normally tend to separate the plates for reasons to be described hereinafter. Each of the plates 68 includes a pair of angularly positioned, hingedly mounted staking pins 72 thereon which pass through an angular hole or aperture 74 in the pressure plate 66. Thus when pressure plate 66 is away from the plate 68, due to the action of springs 70, the staking pins 72 are retracted in the aperture 74. However, upon pressure applied through the hydraulically controlled pressure members 24 and 26, the springs 70 are compressed, moving plate 68 toward plate 66 and causing the staking pins 72 to be cammed inwardly about their pivot for gouging into the shaft for upturning material against the laminations 47, which, due to the pressure exerted thereagainst, are held in firmly juxtaposed position. As the two pressure members 24 and 26 come together, it is apparent that the laminations 47 are axially positioned on shaft 49 and are pressed tightly together and are then staked at four points by the pins 72 which preferably number two at each side. When the staking operation is complete, the members 24 and 26 retract and the elevated nest 42 moves downwardly until the fingers 56 engage the shaft 49 of the armature 48, lifting it out of the nest and onto the discharge chute 76 whence it rolls into a supply bin.

The chute 76 is provided with a switch MS5 which is similar to switch MS2 and includes a hinged actuating member 78 which does not open-circuit the switch unless two armatures are in position thereon simultaneously. Thus the switch MS5 is always close-circuited unless armatures build up in the discharge chute until two are in position simultaneously on the member 78 which will then open-circuit switch MS5. In this manner, the machine is shut down since it is apparent that if the discharge chute should fill up with armatures, the nest 42 would be unable to discharge a completed armature and in the cycle of operation, the entire machine would be damaged. Normally, the switch MS5 is not effected by a single armature rolling down the chute and is never open-circuited unless two armatures are both present on the member 78.

Another safety feature in the device may be noted in Fig. 6 wherein a pair of micro switches MS3 and MS4 are provided which are normally close-circuited. These switches are never effected by retraction of the members 24 and 26 unless springs 70 fail to separate the plates 66 and 68. In this event, guide pins 80 protrude through the fixed plate 68 a distance sufficient to engage either of the micro switches MS3 or MS4 and thus open-circuit one or both control switches. This precaution is necessary since if the springs 70 do not separate the plates, the staking pins 72 protrude into that portion of the cylindrical shaft nest which is to receive the armature shaft on the next operation and it is obvious that if this condition prevails, the shaft will be improperly gouged by the staking pins as it enters the nests. Thus, the machine will not function until the plates 66 are in proper position to insure that the punches 72 are not in the way of the armature shaft 49. It is to be understood that opening of either or both of the switches MS3 or MS4 will disrupt the control system which will now be explained.

Referring to Fig. 9, the hydraulic and mechanical controls are shown in diagrammatic form. A pump and its motor (not shown) are provided for furnishing hydraulic fluid under pressure to the various cylinders of the machine, while a motor M2 operates a speed reducer 89 which operates hydraulic control valves 87, 88 and 90 through necessary cams which are properly set on a control shaft 82. The speed reducer 89 is shown geared to the cam driving member or shaft 82 which includes three control cams 81, 84 and 86 mounted thereon which control the three fluid control valves 87, 88 and 90 that operate to control the action of the elevator 40 in both directions through valve 87 and operate to control the action of the pressure members 24 and 26 through valves 88 and 90, respectively, it being understood that when the valves are moved in one direction by the cams, the devices controlled thereby function in one direction, whereas the reverse is true when the cams are turned approximately 180°. This is accomplished through hydraulic cylinders as is well known in the art. The particular hydraulic system and conduits is not shown in detail since this is of the usual type and forms no part of this invention.

Referring to the electrical control circuit shown in Fig. 10, closure of a main switch 92 supplies current to the primary of a transformer T1 which conditions the control circuit for operation. When it is desired to start the device, a push button switch PB1 is closed which completes the circuit through normally closed micro switches MS3, MS4 and MS5 and through a relay coil R1. Energization of relay coil R1 closes a set of holding contacts Rc1 around the push button switch and simultaneously closes the contacts 94 of a relay controlling the motor M1 which operates the pump. Thus hydraulic fluid is now supplied to the system which is ready for operation. The motor M2 cannot be started until the supply of armatures 48 on chute 41 is sufficient to close normally open micro switch MS1 and micro switch MS2 to energize the relay coil R2 which closes the holding contacts Rc2 around the switch MS1. Energization of relay coil R2 simultaneously closes the contacts 96 to start the speed reducing motor M2 which initiates automatic hydraulic operation of the device whereupon the device will operate continuously until such time as either the supply of armatures runs out in supply chute 41 or until some emergency occurs, such as piling up of armatures on the discharge chute or the members function improperly on the pressure plates 66. In this manner, the entire device is automatically controlled and insured against damage due to any abnormal condition. Push button switch PB2 is a spring closed switch which may be depressed to break the circuit to coil R1 when it is desired to cease operation.

While the embodiments of the present invention as herein disclosed, constitute preferred forms, it is to be understood that other forms might be adopted.

What is claimed is as follows:

1. In a machine for staking a plurality of armature plates in position upon a shaft, the combination comprising; a supply source for supplying shaft and plate assemblies in unstaked condition, an elevator including a nest therein adapted to receive a shaft and plate assembly from said source, means for moving said elevator into another plane for carrying said shaft and plate assembly therewith, opposed pressure means including spring pressed pressure plates operable when said elevator is in said another position for moving towards one another and for resiliently pressing said plates into tight juxtaposed relation and for simultaneously positioning the shaft with respect to said plates, a plurality of staking punches carried by said pressure means and effective only when said plates are in said pressed together relation for being moved by said pressure means by continued movement thereof toward said pressure plates for gouging into the shaft and staking the plates thereto, means for moving said pressure means in opposite directions away from one another and for simultaneously causing said elevator to move to said first position of operation, and means effective as said elevator is moving toward said first position of operation for removing the staked armature assembly from the elevator nest.

2. In a machine for staking a plurality of armature plates in position upon a shaft, the combination comprising; a supply source for supplying shaft and plate assemblies in unstaked condition, an elevator including a nest therein adapted to receive a shaft and plate assembly from said source, means for moving said elevator into another position for carrying said shaft and plate assembly therewith, opposed pressure means including spring pressed pressure plates operable when said elevator is in said another position for moving towards one another and for resiliently pressing said plates into tight juxtaposed relation and for simultaneously positioning the shaft with respect to said plates, a plurality of staking punches carried by said pressure means and effective only when said plates are in said pressed together relation for being moved by said pressure means by continued movement thereof toward said pressure plates for gouging into the shaft and staking the plates thereto, means for moving said pressure means in opposite directions away from one another and for simultaneously causing said elevator to move to said first position of operation, means effective as said elevator is moving toward said first position of operation for removing the staked armature assembly from the elevator nest, and a discharge device for removing the staked assemblies from the proximity of said machine.

3. The machine as claimed in claim 2 including control means for preventing a subsequent operation of the elevator in the event that the discharge device fails to function.

References Cited in the file of this patent

UNITED STATES PATENTS

| | | |
|---|---|---|
| 983,018 | Bechberger | Jan. 31, 1911 |
| 1,613,449 | Forgey et al. | Jan. 4, 1927 |
| 1,762,017 | Grenzer | June 3, 1930 |
| 1,899,325 | Hardman et al. | Feb. 28, 1933 |
| 2,194,125 | Rinehart | Mar. 19, 1940 |
| 2,228,930 | Robinson | Jan. 14, 1941 |
| 2,236,180 | Kost | Mar. 25, 1941 |
| 2,333,200 | Roe | Nov. 2, 1943 |
| 2,337,667 | Kuehlman | Dec. 28, 1943 |
| 2,390,170 | Poole | Dec. 4, 1945 |
| 2,406,281 | Dahl | Aug. 20, 1946 |
| 2,421,115 | Carlson | May 27, 1947 |
| 2,499,390 | Joy | Mar. 7, 1950 |
| 2,655,718 | Haegele | Oct. 20, 1953 |